United States Patent [19]

Langer, Jr.

[11] 4,277,590
[45] Jul. 7, 1981

[54] POLYMERIZATION OF ALPHA-OLEFINS WITH NOVEL $T_nMR'_{3-n}$ COCATALYSTS

[75] Inventor: Arthur W. Langer, Jr., Watchung, N.J.

[73] Assignee: Exxon Research & Engineering Co., Florham Park, N.J.

[21] Appl. No.: 122,233

[22] Filed: Feb. 15, 1980

Related U.S. Application Data

[60] Division of Ser. No. 49,086, Jun. 18, 1979, Pat. No. 4,215,014, which is a continuation-in-part of Ser. No. 890,324, Mar. 28, 1979, abandoned.

[51] Int. Cl.$^3$ .......................... C08F 4/62; C08F 10/06
[52] U.S. Cl. ..................................... 526/127; 526/124; 526/125; 526/139; 526/140; 526/141; 526/142; 526/351
[58] Field of Search ............... 526/127, 165, 150, 139, 526/140, 141, 142

[56] References Cited

U.S. PATENT DOCUMENTS 3,293,228  12/1966  Takashi et al. ........................ 526/165
3,969,332  7/1976  Gloriod et al. ....................... 526/127

Primary Examiner—Edward J. Smith
Attorney, Agent, or Firm—Richard E. Nanfeldt

[57] ABSTRACT

A new improved catalyst system for alpha-olefin type polymerizations includes a metal alkyl cocatalyst having the formula $T_nMR'_{3-n}$ in combination with a Group IVB-VIII transition metal compound on a support and a Lewis base wherein n is equal to one or two, T is equal to $R_3DCH_2$, and wherein D is selected from the group consisting of Si, Ge or Sn, R is methyl or ethyl, and R' is selected from the group consisting of $C_1$ to $C_8$ primary alkyl or aralkyl groups including unhindered branched groups and M is selected from the group consisting of aluminum, gallium, or indium. The improved catalyst system provides both increased polymerization activity and polymers having a high degree of isotactic stereoregularity as well as lower catalyst residue.

1 Claim, No Drawings

POLYMERIZATION OF ALPHA-OLEFINS WITH NOVEL $T_nMR'_{3-n}$ COCATALYSTS

CROSS REFERENCE TO RELATED APPLICATION

This is a division of application Ser. No. 049,086, filed June 18, 1979, now U.S. Pat. No. 4,215,014, which was a CIP of application Ser. No. 890,324, filed Mar. 28, 1979, now abandoned.

BACKGROUND OF THE INVENTION

1. Field of the Invention

A new improved catalyst system for alpha-olefin type polymerization includes a metal alkyl cocatalyst having the formula $T_nMR'_{3-n}$ in combination with a Group IVB–VIII transition metal compound on a support and a Lewis base wherein n is equal to one or two, T is equal to $R_3DCH_2$, and wherein D is selected from the group consisting of Si, Ge or Sn, R is methyl or ethyl, and R' is selected from the group consisting of $C_1$ to $C_8$ primary alkyl or aralkyl groups including unhindered branched groups and M is selected from the group consisting of aluminum, gallium or indium. The improved catalyst system provides both increased polymerization activity and polymers having a high degree of isotactic stereoregularity as well as lower catalyst residue.

2. Description of the Prior Art

There is extensive art on the polymerization of ethylene and higher alpha-olefins, including dienes, using Ziegler type catalysts containing either alkyl metals or alkyl metals in which an alkyl group has been replaced by X, OR, SR, $NR_2$, etc., in combination with a transition metal compound of Groups IVB–VIII, where X=halide, and R=$C_1$ to $C_{20}$ hydrocarbyl substituent.

It is well known to use various alkyl aluminum compounds in combination with transition metal compounds of Groups IVB–VIII in Ziegler-type polymerizations of alphaolefins. For stereospecific polymerization of propylene and higher alpha-olefins, the most effective commercially used alkyl metal compounds used commercially are $AlEt_3$ and $AlEt_2Cl$, although $Al(n-Fr)_3$, $Al(n-Bu)_3$, $Al(i-Bu)_3$ and $Al(iBu)_2H$ give similar results. Longer chain alkyl aluminums, such as $Al(n-C)_3$, $Al(n-C_8)_3$, $(n-C_8)_2AlCl$, etc., drastically reduce stereospecificity as shown by much lower heptane insolubles.

This invention claims novel, improved alkyl metal cocatalysts for use with Groups IVB–VIII transition metal compounds for stereospecific polymerization of propylene and higher alpha-olefins. The new cocatalysts are di- or tri-organo metal compounds of aluminum, gallium or indium which contain at least one $R_3SiCH_2$, $R_3GeCH_2$ or $R_3SnCH_2$ group. These cocatalysts having bulky groups yield higher activity and isospecificity than the conventional primary di- or trialkyl metal compounds when used in combination with the various types of transition metal catalysts, such as $MgCl_2$-supported $TiCl_4$, $TiCl_3 \cdot xAlCl_3$, low aluminum, high surface area $TiCl_3$, etc., with or without other catalyst modifiers present, such as Lewis bases, alcohols, phenols, polymers, dispersants, binders and other additives.

A number of U.S. Patents have been issued on the use of tri- or dialkyl organo metal compounds as catalyst for the polymerizations of various $C_3$ and higher alphaolefins. However, these patents fail to teach, imply or infer the inventive concept of having at least one bulky $R_3D$ groups in the tri- or dialkyl organo metal compound in order to be able to simultaneously achieve both increased polymerization activity and improved isotacticity of the resultant polymer. These U.S. Pat. Nos. are: 3,953,414; 3,888,789; 3,992,322; Belgium Pat. No. 845,593 and British Pat. No. 1,335,887.

SUMMARY OF THE INVENTION

The present invention relates to unique and novel catalyst systems for the conventional alpha-olefin type polymerization at significantly improved polymerization activity, wherein the resultant polymers have a high degree of isotactic stereoregularity.

An object of my present invention is to provide improved catalyst systems having a major increase in polymerization activity while being able to control over a wide range the polymer crystallinity, e.g. isotacticity, wherein the catalyst system includes a transition metal compound, at least one Lewis base and an alkyl metal cocatalyst having the formula $T_nMR'_{3-n}$ wherein n is 1 or 2, M is aluminum, gallium or indium and T is $R_3DCH_2$ wherein D is Si, Ge or Sn.

A further object of my present invention is to provide an improved process for alpha-olefin type polymerizations, wherein the polymerization activity is increased and the formed polymer has a high degree of isotactic stereoregularity and a minimum amount of catalyst residues are formed.

A still further object of my present invention is the advantage of being able to use directly the new improved catalyst with any type of transition metal compound without substantial modification of the commercial catalyst preparation of the polymerization plant.

A still further object of my present invention is to provide new improved catalyst compositions wherein the isotacticity of the formed polymer is much less sensitive to a ratio of the cocatalyst $T_nMR'_{3-n}$ compound to the transition metal compound than when the corresponding primary alkyl compounds are used thereby greatly facilitating process control to make higher quantity polymers at more efficient production rates.

GENERAL DESCRIPTION

It is well known in the art to use an alkyl metal compound of Groups I–III in combination with a transition metal compound of Groups IVB–VIII as a catalyst system for olefinic polymerization. While nearly all of the alkyl metal compounds are effective for the polymerization of ethylene, only a few are effective for the preparation of isotactic polymers of propylene and higher alpha-olefins and only $Et_2AlCl$ and $AlEt_3$ have any important commercial utility.

A major cost involved in the polymerization of the alpha-olefins is the cost of the catalyst components. Therefore, the cost of the manufacture of the polymer can be effectively reduced by the use of catalyst systems having a higher polymerization activity. A further concern is the ability to produce polymers having a minimum amount of catalyst residues thereby eliminating a costly deashing operation. A still further concern is the ability to produce polymers having a high degree of isotactic stereoregularity thereby enabling the manufacturer to eliminate the costly operation involving the removal and separation of atactic polymer from the isotactic polymer. The improved catalyst system of the present instant invention provides a means to the manufacturer of obtaining these desirable realizations.

The improved catalyst systems of the present invention which are employed in alpha-olefin polymerizations include a Group IVB-VIII transition metal compound at least one Lewis base and a metal compound having the formula $T_nMR'_{3-n}$ wherein T is $R_3DCH_2$, D being selected from the group consisting of Si, Ge or Sn, preferably Si, R is methyl or ethyl, preferably methyl, M is selected from the group consisting of aluminum, gallium or indium, preferably Al and R' is selected from the group consisting of $C_1$-$C_8$ primary alkyl or aralkyl groups such as ethyl, octyl, benzyl, isobutyle or hydride, preferably $C_2$-$C_4$ primary alkyl or hydrogen, and n is 1 or 2.

The transition metal catalyst compound is a Group IVB-VIII transition metal halide, wherein the halide group is chloride or bromide and the transition metal halide is in the form of solid crystalline compounds, solid solutions or compositions with other metal salts or supported on the surface of a wide range of solid supports. For highest stereospecificity it is desirable to have the transition metal halide, or its support composition, in the layer lattice structure with very small crystallites, high surface area, or sufficient defects or foreign components to facilitate high dispersion during polymerization. The transition metal halide may also contain various additives such as Lewis bases, pi bases, polymers, or organic or inorganic modifiers. Vanadium and titanium halides such as $VCl_3$, $BVr_3$, $TiCl_3$, $TiCl_4$, $TiBr_3$ or $TiBr_4$ are preferred, most preferably $TiCl_3$ or $TiCl_4$ and mixtures thereof. The most preferred $TiCl_3$ compounds are those which contain $TiCl_4$ edge sites on the layer lattice support such as alpha, delta, or gamma $TiCl_3$ or various structures and modifications of $TiCl_3$ or $MgCl_2$. The most preferred $TiCl_4$ compounds are those supported on chloride layer lattice compounds such as $MgCl_2$. Minor amounts of other anions may be also present such as other halides, pseudo-halides, alkoxides, hydroxides, oxides or carboxylates. Mixed salts or double salts such as $K_2TiCl_6$ or $MgTiCl_6$ can be employed alone or in combination with electron donor compounds. Other supports besides $MgCl_2$ which are useful are hydroxychlorides, oxides or other inorganic or organic supports. The most preferred transition metal compound is the transition metal halide—$TiCl_4$ on an $MgCl_2$ support.

The Lewis bases which can be employed in the combination with the tri- or dialkyl metal organo compound of Al, Ga and In, in combination with the Group IVB-VIII transition metal compound as long as they do not cause excessive cleavage of metal-carbon bonds, or loss of active sites, wherein the Lewis base is selected from the group consisting of tertiary amines, esters, phosphines, phosphine oxides, phosphates (alkyl, aryl), phosphites, hexaalkyl phosphoric triamides, dimethyl sulfoxide, dimethyl formamide, secondary amines, dialkyl ethers, epoxides, saturated and unsaturated heterocycles, or cyclic ethers and mixtures thereof. Typical but non-limiting examples are ethylbenzoate, diethyl ether or tetrahydrofuran. The most preferred is ethylbenzoate.

Magnesium salts may also be employed with the instant catalysts if they are partially or wholly solubilized by reaction with the alkyl metal components. Nonlimiting examples include $MgBr_2$, $ClMgCR''$, $R''OMgOOCR''$, $Mg(OR'')_2$, and the like.

The improved alkyl metal cocatalysts of the instant invention have the general formula $T_nMR'_{3-n}$ wherein n=1 or 2, T is $R_3DCH_2$, D being selected from the group consisting of Si, Ge or Sn, preferably Si, R being methyl or ethyl, preferably methyl, M is selected from the group consisting of aluminum, gallium or indium and R' is selected from the group consisting of $C_1$-$C_8$ primary alkyl or aralkyl groups including unhindered branched groups such as ethyl, octyl, benzyl, isobutyl or hydride, preferably $C_2$-$C_4$ primary alkyl or H. Especially suitable cocatalysts are $Me_3SiCH_2AlEt_2$, $(Me_3SiCH_2)_2AlEt$, $(Me_3SiCH_2)_2Aln$-Bu or $Me_3SiCH_2AlEt(octyl)$, wherein $(Me_3SiCH_2)_2AlEt$ is preferred. The most preferred compounds have the formula $T_2AlR'$.

For the alkyl metal cocatalysts of this invention, the most preferred transition metal compounds contain $TiCl_4$ supported on $MgCl_2$ and one or more Lewis bases.

The molar ratio of the alkyl metal cocatalyst to the transition metal compound is about 0.5:1 to about 50:1, more preferably about 1:1 to about 20:1, and most preferably about 5:1 to about 10:1. The number of moles of Lewis base to organometal compound can vary widely but is preferably about 0.1:1 to 1:1.

The catalyst system of the invention enables the process for making alpha-olefin polymers having a high degree of isotactic stereoregularity to be carried out at a temperature of about 25° to about 150° C., more preferably about 40° to about 80° C., at pressures of about 1 atm. to about 50 atm. The reaction time for polymerization is about 0.1 to about 10 hours, more preferably about 0.5 to about 3 hours. Due to the high catalyst activity, shorter times and temperatures below 80° C. can be readily employed.

The reaction solvent for the system can be any inert paraffinic, naphthenic or aromatic hydrocarbon such as benzene, toluene, xylene, propane, butane, pentane, hexane, heptane, cyclohexane, and mixtures thereof. Preferably, excess liquid monomer is used as solvent. Gas phase polymerizations may also be carried out with or without minor amounts of solvent.

Typical, but non-limiting examples of $C_2$-$C_{20}$ alpha-olefinic monomers employed in the present invention for the manufacture of homo-, co- and terpolymers are ethylene, propylene, butene-1, pentene-1, hexene-1, octadecene-1, 3-methylbutene-1, styrene, vinylidene norbornene, 1,5-hexadiene and the like and mixtures thereof. Isotactic polymerization of propylene and higher olefins is especially preferred.

The alkyl metal cocatalysts and the transition metal compound in combination with the Lewis base can be added separately to the reactor but are preferably premixed before addition to the reactor. Employing non-hindered alkyl metal compounds with the transition metal compound does not provide the improved catalyst efficiency and stereospecificity as envisioned in this application. The concentration of the transition metal in the polymerization zone is about 0.001 to about 5 mM, preferably less than about 0.1 mM.

DETAILED DESCRIPTION OF THE PREFERRED EMBODIMENTS

The advantages of the unique and novel catalyst system and the novel process for the alpha-olefin polymerizations of the present instant invention can be more readily appreciated by reference to the following examples and table.

EXAMPLE 1

A sample of $(Me_3SiCH_2)_2AlEt$ was prepared by reacting $2Me_3SiCH_2Li$ with 1 $AlEtCl_2$, treating the product with dry powdered KCl to remove unreacted chloroaluminum compounds and vacuum fractionating the liquid phase. One of the distillation cuts (35 wt. % in deuterobenzene plus $C_6H_6$) gave the correct NMR spectrum for the desired product ($\delta C\text{-}CH_3 = 1.17$ ppm; $\delta SiCH_3 = 0.16$ ppm; $\delta SiCH_2 = -0.41$ ppm calculated from benzene reference).

$Me_3SiCH_2AlEt_2$ was made by mixing equimolar amounts of $(Me_3SiCH_2)_2AlEt$ and $AlEt_3$.

The above alkyl aluminum compounds were used as cocatalysts with a catalyst prepared by reacting anhydrous $MgCl_2$ (5 moles) with $TiCl_4 \cdot C_6M_5COOEt$ (1 mole) in a ball mill 4 days, followed by a neat $TiCl_4$ treat at 80° C., 2 hours, heptane washes and vacuum drying. The catalyst contained 3.44% Ti. Using 1 mmole cocatalyst and 0.2 g catalyst in 500 ml. n-heptane, propylene was polymerized at 65° C., 1 hour at 765–770 mm. The results are compared in Table I to those obtained using the conventional $AlEt_3$ cocatalyst.

TABLE I

| Run | Al Alkyl | Rate g/g Cat/hr | % HI[a] | I.V.[b] |
|---|---|---|---|---|
| A | $AlEt_3$ | 244 | 83.1 | 2.25 |
| B | $Me_3SiCH_2AlEt_2$ | 182 | 90.8 | 3.00 |
| C | $(Me_3SiCH_2)_2AlEt$ | 140 | 92.9 | 3.30 |

[a] Percent insoluble in boiling n-heptane.
[b] Inherent viscosity determined at 0.5g polymer per liter decahydronaphthalene at 135° C.

The polypropylene isotacticity increased substantially when ethyl groups were replaced by trimethylsilylmethyl groups. In Run C, the rate was about seven times that of the commercial $Et_2AlCl/TiCl_3 \cdot 1/3AlCl_3$ catalyst at the same heptane insolubles.

Since many modifications and variations of this invention may be made without departing from the spirit or scope of the invention thereof, it is not intended to limit the spirit or scope thereof to the specific examples thereof.

What is claimed is:

1. An improved process for the polymerization of $C_2$ to $C_{20}$ monomers and mixtures thereof to solid homo-, co-, or terpolymers by contacting said monomers with a catalyst system including:
   (a) a Group IVB to VIII transition metal halide;
   (b) at least one alkyl metal cocatalyst having the formula $TnMR'_{3-n}$ wherein $n = 1$ or 2, T is $R_3DCH_2$, D being selected from the group consisting of Si, Ge and Sn, M being selected from the group consisting of Al, Ga and In, R being a methyl or ethyl group and R' is selected from the group consisting of $C_1$–$C_8$ primary alkyl or aralkyl groups including unhindered branched groups, a molar ratio of said alkyl metal cocatalyst to said transition metal halide being about 0.5:1 to about 50:1; and
   (c) at least one Lewis base in sufficient amounts as long as said Lewis base does not cause excessive cleavage of metal-carbon bonds or loss of active sites.

* * * * *